Sept. 4, 1962 R. J. OLIVER 3,052,036

BUBBLE TYPE LEVEL FOR HAND DRILL

Filed Sept. 15, 1958 2 Sheets-Sheet 1

INVENTOR.
RAYMOND J. OLIVER
BY Hansen and Lane
ATTORNEYS

INVENTOR.
RAYMOND J. OLIVER
BY Hansen and Lane
ATTORNEYS

United States Patent Office 3,052,036

Patented Sept. 4, 1962

3,052,036

BUBBLE TYPE LEVEL FOR HAND DRILL

Raymond J. Oliver, 451 S. 1st St., San Jose, Calif.

Filed Sept. 15, 1958, Ser. No. 760,932

2 Claims. (Cl. 33—207)

The present invention relates to levels, and pertains more particularly to a level for mounting on a hand drill for directing a drill mounted therein at different angles relative to the horizontal.

The invention provides an improved and simplified level for mounting on a hand drill.

The invention also provides a level for mounting on a hand drill whereby, by means of said level, the axis of chuck rotation of such drill can be positioned either horizontally, vertically upwardly, vertically downwardly or at an angle of 45 degrees either above or below the horizontal.

Another object of the invention is to provide a level for a hand drill, and comprising a domed bubble chamber of less than hemispherical extent adapted to be mounted on such drill with a chordal plane of said chamber intersecting the axis of chuck rotation of such drill at an angle of 45°.

These, and other objects and advantages of the invention, will be apparent from the following description and the accompanying drawings, wherein:

FIG. 1 is a side elevational view of a hand drill having a level embodying the present invention mounted thereon, the solid lines showing the position of the level for locating the drill axis at angles between horizontal and the vertical with the drill directed downwardly, and the broken lines showing the position of the level for locating the drill axis at angles between horizontal and vertical with the drill directed upwardly.

Figures 1, 2, 3, 4, 5, 6:
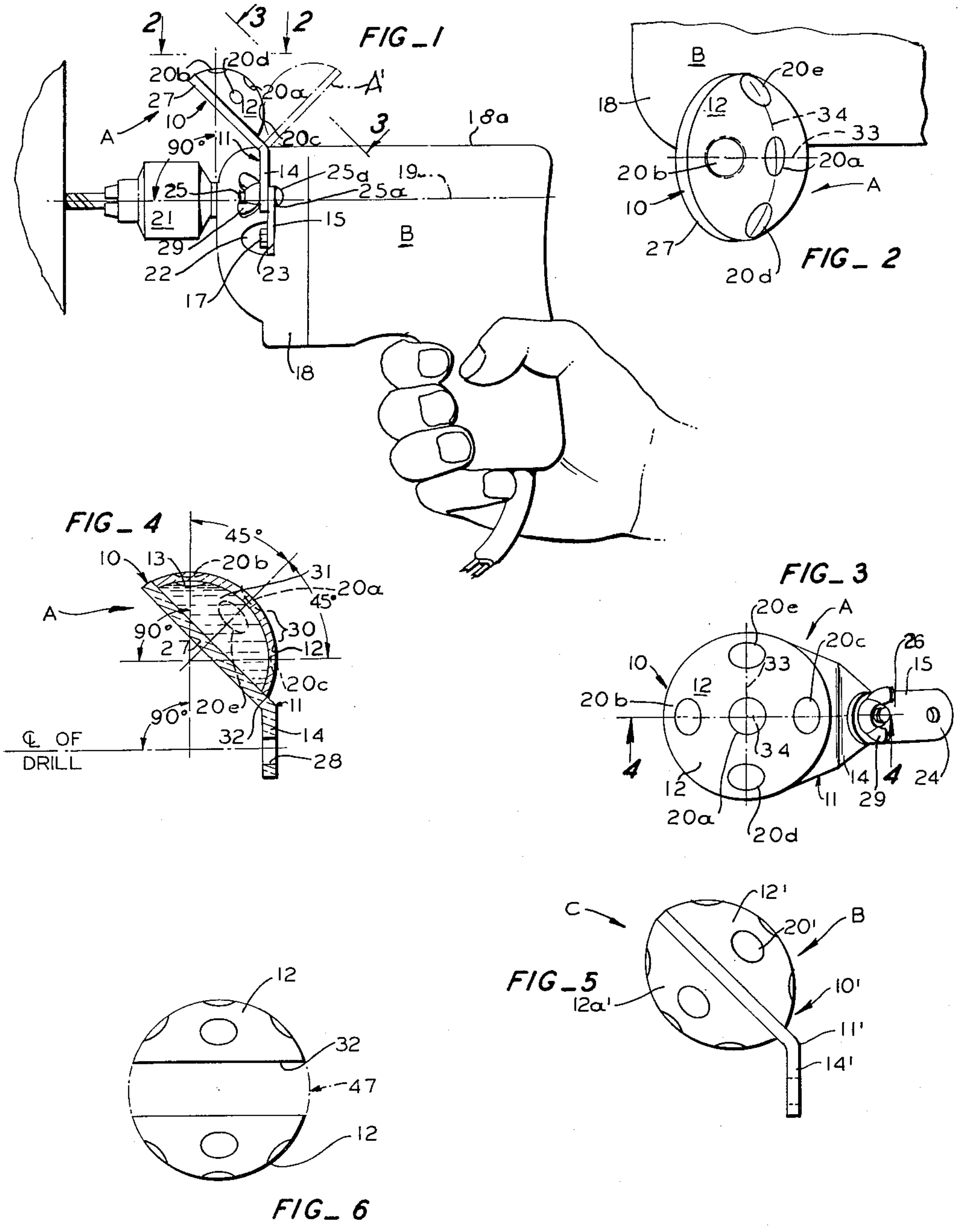
FIG. 2 is a fragmentary elevational view taken along line 2—2 of FIG. 1.
FIG. 3 is a fragmentary elevational view, showing the level and bracket plate, taken in the direction of the arrows 3—3 of FIG. 1.
FIG. 4 is a sectional view through the level taken as along line 4—4 of FIG. 3.
FIG. 5 is a side elevational view of a modified form of level embodying the invention.
FIG. 6 is a side elevational view showing the arcuate extent of the spherically curved bubble chambers employed in the levels of FIGS. 1–5.

Briefly, the form A of the invention shown in FIGS. 1–4 comprises a single bubble chamber 10 comprising a base portion 11, and a domed cover member 12 of transparent material secured in liquid tight relation to a flat portion 27 of said base member. The bubble chamber cover member 12 is of sufficient arcuate extent to permit movement of an air bubble 13 in the otherwise liquid filled chamber 10 from a position centrally of the arc of curvature of the cover member 12, to a position slightly over 45 degrees distant therefrom in any direction along the arc of curvature of the chamber cover 12.

The chamber base portion 11 is provided with a mounting portion 14 disposed at an angle of 45 degrees to the plane of the flat base portion 27. The mounting portion 14 is adapted to be secured, in co-planar relation, to a bracket plate 15 secured by a housing screw 17 to the housing 18 of an electric hand drill B with the bracket plate 15 at an angle of 90 degrees to the axis of chuck rotation 19 of such hand drill. A plurality of markings 20 are provided at desired points in the bubble chamber 10, for centering the bubble 13 therein, thereby to position the axis of chuck rotation 18 at selected angles relative to the horizontal. For example, when the bubble 13 is centered in the bubble chamber 10 as shown in FIG. 1, the axis of chuck rotation 19 will be disposed horizontally.

Referring to the drawings in detail, and describing first the form of the invention shown in FIGS. 1–4, the level A is intended for mounting on an electrical hand drill, such as the hand drill B (FIG. 1). While there are many minor variations between electric hand drills of different makes, most of such drills have the following points in common: a motor driven chuck 21, a motor housing 18 having at least one side **18*a* thereof parallel to the axis of chuck rotation 19, and, in many cases, a screw recess 22 in the drill housing 18 with a flat, screw head seating surface 23 of such recess disposed at right angles to the axis of chuck rotation 19, and the head of a housing screw 17** seated on this surface.

For mounting the level A (FIG. 1) on the hand drill B, the bracket plate 15 is of stiff, strong material, such as rigid plastic material or mild spring steel, and has one end 24 thereof (FIG. 3) rounded to fit into the recess 22. The housing screw 17 is inserted in a hole 26 (FIG. 3) provided therefor in the bracket plate 15, and when the screw is drawn down tightly it grips the bracket plate 15 firmly between the head of the screw and the recess bottom surface 23. Since, as mentioned previously herein, the recess bottom surface is at right angles to the axis of chuck rotation 19, the bracket plate 15 is thus disposed in a plane at right angles to the axis of chuck rotation.

A mounting screw 25 is also inserted in a hole provided therefor in the outer end of the bracket plate 15, and its head **25*a* is secured to the bracket plate 15** to prevent relative rotation between the screw and the bracket plate.

The base portion 11 preferably is of transparent plastic material, such as Lucite, and the outer chamber mounting portion 27 thereof is of a size to receive and support the bubble chamber cover 12 thereon. The 45 degree offset mounting portion 14 (FIG. 4) has a hole 28 therethrough to receive the bracket plate screw 25. With the screw 25 inserted in the hole 28, and a wing nut 29 screwed down tight on the screw 25 as showni n FIG. 1, the contacting faces of the bracket plate 15 and the 45 degree offset portion 14 are clamped together in co-planar relation.

The bubble chamber cover 12 is of concavo-convex shape, and preferably of spherical curvature, and of substantially equal thickness through-out.

The chamber cover 12 terminates on a chordal plane, and is sealed in liquid-tight relation to a flat side of the outer portion 27 of the base 11.

The markings 20 on the chamber cover 12 for centering the bubble 13 therebeneath may comprise circular markings scribed in the bubble chamber cover 12, and of a diameter to correspond substantially to that of the bubble 13 when therebeneath. These markings 20 preferably comprise a marking **20*a* centrally of the bubble chamber cover, and four other similar markings 20*b*, 20*c*, 20*d* and 20*e* spaced at 45 degrees of circular arc from the central bubble 20a, and disposed along two diametrical planes 33 and 34 (FIG. 3) intersecting centrally of the central marking 20a** at an angle of 90 degrees to each other.

The arcuate extent of the domed cover 12 preferably is sufficiently greater than 90 degrees to permit the bubble 13 (FIG. 4) to move from centered position beneath the central bubble marking 20a, to slightly beyond centered position with respect to any of the other markings 20b, 20c, 20d or 20e. A suitable arcuate extent of the cover member 12 is of the order of 110 degrees.

The diameter of each bubble marking 20 preferably is the same as the diameter of the bubble 13, and also the same as the spacing 30 between adjacent markings along the same diametrical circle 33 or 34. Thus, when the bubble 13 is centered between adjacent markings 20 on the same diametrical circle 33 or 34, the bubble will lie half way between the centers of said markings, and therefore will indicate a tilt of the chuck axis of half way, or 22½° from the position of such axis when the bubble is centered beneath either of such markings.

The bubble chamber 10 is filled with suitable liquid 31 with the exception of the usual air bubble 13. Since the manner of filling levels with liquid, and of sealing them off when filled, is well known, it will be unnecessary to describe these details herein.

Figure 7:
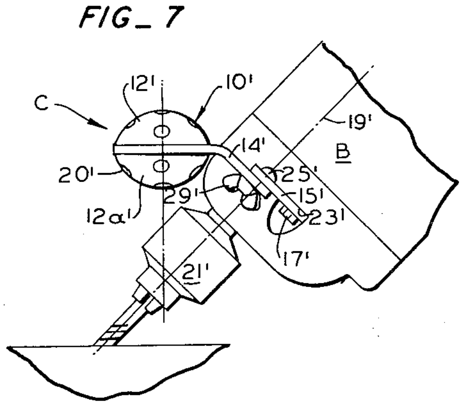
FIG. 7 is a fragmentary side elevational view of the level shown in FIG. 5 used in positioning the drill for drilling a hole at an angle of 45 degrees from the horizontal.
Figure 8:
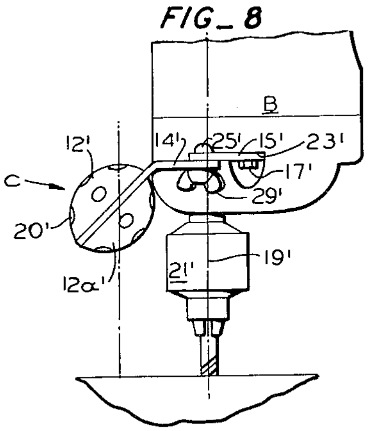
FIG. 8 is a similar view with the level used for drilling a hole with its axis vertical and the point of the drill directed downwardly.

The operation of the level A (FIGS. 1–4) is as follows: With the level A mounted on the hand drill B as shown in FIG. 1, and as described previously herein, when the bubble 13 is centered beneath the most remote marking 20b, the axis of rotation 19 of the drill chuck 21, which is also the axis of rotation of a drill 35 chucked therein, will be horizontal. When the bubble 13 is centered beneath the innermost marking 20c, the drill axis 19 will be vertical, and directed downwardly as shown in FIG. 8. When the bubble 13 is centered beneath the central marking 20a the drill axis 19 will be directed angularly downwardly at an angle of 45 degrees from the horizontal as shown in FIG. 7.

Figure 10:
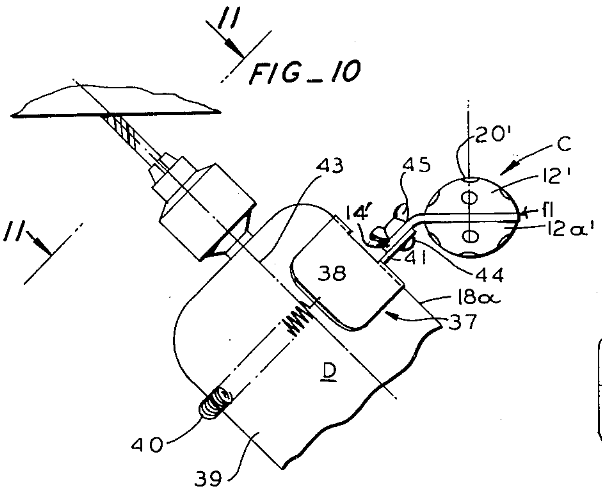
FIG. 10 is a view showing the level illustrated in FIGS. 5–9 mounted on a modified form of bracket and positioned for drilling a hole upwardly at an angle of 45 degrees from the horizontal.
Figure 9:
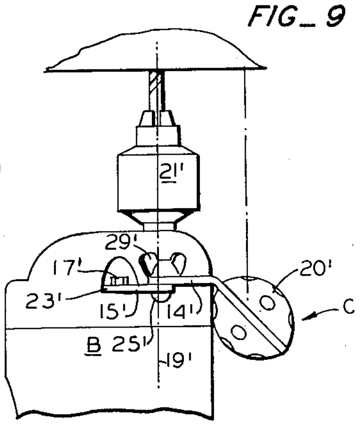
FIG. 9 is a similar view showing the drill axis vertical and the drill directed upwardly.

When it is desired to drill directly upwardly, the level A is removed from the bracket plate 15 by unscrewing the wing nut 29, the level A is reversed to its broken line position A′ of FIG. 1, and the wing nut 29 is again tightened on the screw 25. With the level A thus reversed, and the bubble 13 centered beneath the center marking 20a, the drill axis 19 will be directed upwardly at an angle of 45 degrees from the horizontal as shown in FIG. 10, and by centering the bubble 13 in the innermost marking 20c the drill axis 19 will be directed vertically upward as shown in FIG. 9.

In the modified form C of the invention shown in FIGS 5 and 7–11, most of the parts are similar to corresponding parts of the form A of the invention shown in FIGS. 1–4. Such similar parts of the form C of the invention are designated by the same reference numerals as in form A, plus the prime (′).

In the form C (FIGS. 5–11) bubble chamber covers 12′ and 12′a are provided, one on each side of the outer portion 27′ of the base member 11′. With this modified form C of the invention, it obviously is unnecessary to reverse the position of the level C when going from a below horizontal to an above horizontal position of the drill axis 19′.

The use of the modified form C of the invention will be apparent to one having an understanding of the use of the level A (FIGS. 1–4) as explained previously herein. It may be advisable to point out however, that in directing the drill axis 19′ at angles at and below the horizontal the chamber cover 12′ will be uppermost, while when directing the drill axis 19′ at angles at and above the horizontal the other bubble chamber 12′a will be uppermost.

Figure 11:
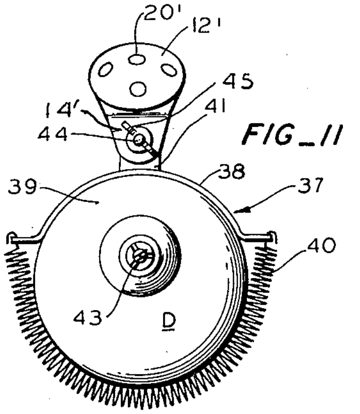
FIG. 11 is a sectional view taken along line 11—11 of FIG. 10.

A modified form of bracket plate 37 is shown in FIGS. 10 and 11 for use on electric hand drills D which may not be provided with a suitable housing screw 17 and screw recess 22 for mounting a bracket plate 15 or 15′ of the type shown in FIGS. 1–9. The bracket plate 37 comprises a saddle mount portion 38 of stiff material adapted to seat snugly around one side of a hand drill housing 39 by means of a tension spring 40. A flat ear 41, formed of material cut from the saddle mount 38, extends laterally outwardly from the saddle mount 38, at an angle to be positioned at right angles to the axis of chuck rotation 43 when the saddle mount portion 38 is attached to the housing 39 as shown in FIGS. 10 and 11.

The ear 41 is provided with a screw 44 and wing nut 45 for securing the 45 degree offset portion 14′ of the base portion 11′ of the level A or C thereto. When thus mounted on the hand drill housing 39, the level A or C operates in the same manner as when mounted on the bracket plate 15.

It will be noted in FIG. 6 which shows the relation between two of the bubble chambers 12 and a complete sphere 47, that the amount of material required for each curved bubble chamber 12 is considerably less than that which would be required for a semi-spherical bubble chamber, since two bubble chambers of the latter extent would require enough material for the entire sphere 47. By forming these bubble chambers 12 of sheet material in a well known manner by the use of dies (not shown) said chambers can be made very easily and inexpensively.

The invention provides an improved and simplified level for use on electric hand drills and the like, and one which may be easily mounted on most, if not all, presently known types of hand drills.

While I have illustrated and described a preferred embodiment of the present invention, and one modified form thereof, it will be understood, however, that various changes and modifications may be made in the details thereof without departing from the scope of the invention as set forth in the appended claims.

Having thus described the invention, what I claim as new and desire to protect by Letters Patent is defined in the following claims.

1. A level for an electric hand drill having a motor driven tool chuck, and having a housing with a planiform face thereon disposed perpendicularly to the chuck axis and with a screw head seated on such housing face; said level comprising a flat bracket plate adapted to be secured by such screw head flat against such face and to extend laterally therefrom, a bubble chamber comprising a base of flat, rigid, sheet material, said base comprising two portions disposed at an angle of 45° to each other, means for securing one of said base portions in co-extensive, parallel relation to said bracket plate, a transparent dome of concavo-convex spherical curvature with an arcuate extent of over 90 degrees and less than 180 degrees and with its periphery defining a chordal plane, said dome being secured and sealed peripherally thereof to the other base portion to define a bubble chamber therebetween, said bubble chamber being substantially filled with liquid and having an air bubble therein, a circular bubble centering marking centrally of said dome, a pair of other circular bubble centering markings on said dome and spaced center-to-center in opposite directions from said central marking by an arc of 45 degrees, the centers of said markings defining a great circle of the bubble chamber dome, whereby, when the bracket plate is secured in co-planar relation on such housing face, and the plane defined by the centers of the three bubble markings parallel to the chuck axis, when the drill is positioned when the bubble centered in the central marking the chuck axis will be disposed at an angle of 45 degrees from the horizontal, when the bubble is centered in one of said other markings the chuck axis will be horizontal, and when the bubble is centered in the other of said other markings the chuck axis will be vertical.

2. A level for an electric hand held rotary cutting tool having a housing with a planiform face thereon disposed perpendicularly to the cutting line of such tool, a bubble chamber comprising a base of flat, rigid, sheet material, said base comprising two portions disposed at an angle of 45° to each other, means for securing one of said base portions in co-extensive, parallel relation to said housing face, a transparent dome of concavo-convex spherical curvature with an arcuate extent of over 90 degrees and less than 180 degrees and with its periphery defining a chordal plane, said dome being secured and sealed peripherally thereof to the other base portion to define a bubble chamber therebetween, said bubble chamber being substantially filled with liquid and having an air bubble therein, a circular bubble centering marking centrally of said dome, a pair of other circular bubble centering markings on said dome and spaced center-to-center in opposite directions from said central marking by an arc of 45 degrees, the centers of said markings defining a great circle of the bubble chamber dome, whereby, when said one base portion is secured in co-planar relation on such housing face with the plane defined by the centers of the three bubble markings parallel to the cutting line of such tool, when the drill is positioned with the bubble centered in the central marking such cutting line will be disposed at an angle of 45 degrees from the horizontal, when the bubble is centered in one of said other markings the chuck axis will be horizontal, and when the bubble is centered in the other of said other markings the chuck axis will be vertical.

References Cited in the file of this patent

UNITED STATES PATENTS

| | | |
|---|---|---|
| 2,543,139 | Veit | Feb. 27, 1951 |
| 2,757,458 | Zipser | Aug. 7, 1956 |
| 2,767,483 | Sauer | Oct. 23, 1956 |
| 2,806,296 | Weichert | Sept. 17, 1957 |

FOREIGN PATENTS

| | | |
|---|---|---|
| 28,734 | Great Britain | Dec. 10, 1910 |